(12) United States Patent
Verdouw et al.

(10) Patent No.: US 11,691,104 B2
(45) Date of Patent: Jul. 4, 2023

(54) SYSTEM AND METHODS FOR CARBON DIOXIDE CAPTURE AND RECOVERY

(71) Applicant: Enviro Ambient Corporation, Marco Island, FL (US)

(72) Inventors: Andrew Verdouw, Georgetown, IN (US); Sanjeev Jolly, Louisville, KY (US)

(73) Assignee: Enviro Ambient Corporation, Marco Island, FL (US)

( * ) Notice: Subject to any disclaimer, the term of this patent is extended or adjusted under 35 U.S.C. 154(b) by 0 days.

(21) Appl. No.: 17/882,245

(22) Filed: Aug. 5, 2022

(65) Prior Publication Data

US 2022/0370956 A1   Nov. 24, 2022

Related U.S. Application Data

(63) Continuation of application No. PCT/US2022/024546, filed on Apr. 13, 2022.

(60) Provisional application No. 63/174,313, filed on Apr. 13, 2021.

(51) Int. Cl.
*B01D 53/02* (2006.01)
*B01D 53/62* (2006.01)
*B01D 53/75* (2006.01)

(52) U.S. Cl.
CPC ............ *B01D 53/62* (2013.01); *B01D 53/75* (2013.01); *B01D 2257/504* (2013.01); *B01D 2258/0283* (2013.01)

(58) Field of Classification Search
CPC ........ B01D 2252/103; B01D 2257/504; B01D 2258/0283; B01D 53/14; B01D 53/62; B01D 53/75; Y02C 20/40
See application file for complete search history.

(56) References Cited

U.S. PATENT DOCUMENTS

| 6,890,497 B2 * | 5/2005 | Rau ........................ B01D 53/62 |
| | | 423/220 |
| 8,940,258 B2 | 1/2015 | Vera-Castaneda |
| 2001/0022952 A1 * | 9/2001 | Rau ........................ B01D 53/62 |
| | | 422/600 |
| 2009/0232861 A1 | 9/2009 | Wright et al. |

(Continued)

FOREIGN PATENT DOCUMENTS

WO    WO-2010/036436 A1    4/2010

OTHER PUBLICATIONS

International Search Report and Written Opinion for Application No. PCT/US22/24546 dated Jun. 29, 2022.

*Primary Examiner* — Christopher P Jones
(74) *Attorney, Agent, or Firm* — Lucas P. Watkins; Stephen J. Kenny; Foley Hoag LLP

(57) ABSTRACT

Disclosed are methods and systems for capturing carbon dioxide ($CO_2$) from an input gas stream (e.g., flue gas from a combustion process). In particular, the system includes a $CO_2$ absorption module that directs supersaturated $CO_2$ process water to a $CO_2$ recovery process. The $CO_2$ recovery process includes a sparging seal vessel, followed by an agitator, followed by a stripper unit, followed by an outgassing tank, and lastly a membrane separator, configured to outgas $CO_2$ from the supersaturated process water and direct the gaseous $CO_2$ into a $CO_2$ collection header.

27 Claims, 11 Drawing Sheets

(56) References Cited

U.S. PATENT DOCUMENTS

| | | |
|---|---|---|
| 2010/0229725 A1 | 9/2010 | Farsad et al. |
| 2013/0296615 A1 | 11/2013 | Littleford et al. |
| 2020/0147542 A1* | 5/2020 | Jolly .................... B01D 53/18 |

* cited by examiner

SYSTEM AND METHODS FOR CARBON DIOXIDE CAPTURE AND RECOVERY

RELATED APPLICATIONS

This application is a continuation of International Application No. PCT/US2022/024546, filed on Apr. 13, 2022; which claims the benefit of U.S. Provisional Application No. 63/174,313, filed on Apr. 13, 2021. The entire contents of each of these applications are incorporated herein by reference.

FIELD OF THE INVENTION

Embodiments of the present disclosure generally relate to carbon dioxide ($CO_2$) capture and recovery. In particular, the present disclosure describes assemblies, systems, and methods for extraction of $CO_2$ from an input gas (e.g., flue gas from a combustion process) via a process fluid (e.g., water) and degassing of the $CO_2$ from supersaturated process fluid solution.

BACKGROUND

Carbon dioxide ($CO_2$) is a significant greenhouse gas, and increased concentrations in the atmosphere and in the oceans are leading to global warming and ocean acidification, respectively. $CO_2$ is generated by various sources including power plants, industrial processes, and automobile emissions. $CO_2$ capture and sequestration technologies can greatly reduce $CO_2$ emissions from certain sources. Captured $CO_2$ has many uses, including as a precursor in the chemical industry (e.g., for urea, methanol, and metal carbonates), in carbonated beverages, and as a compressed gas in portable pressure tools (e.g., welding and airguns). Current methods of $CO_2$ capture and sequestration have certain limitations and drawbacks. Various $CO_2$ capture methods and systems are described in PCT Application Publication Nos. WO 2015/024014 and WO2018100430. Alternate methods of $CO_2$ capture are needed.

BRIEF SUMMARY

In accordance with an aspect of the disclosure, a system is provided comprising: a $CO_2$ absorber module comprising: an intake configured to receive an input gas; a heat exchanger coupled to the intake; a fogging array coupled to the heat exchanger, wherein the fogging array configured to spray a process fluid via droplets to thereby capture $CO_2$ from the input gas; a packing section coupled to the fogging array; a mist eliminator coupled to the packing section; an exhaust coupled to the mist eliminator, the exhaust configured to release an exhaust gas; a sparging seal vessel fluidly coupled to the fogging array, the packing section, and the mist eliminator; an agitator fluidly coupled to the sparging seal vessel; a stripper unit fluidly coupled to the agitator; an outgassing tank fluidly coupled to the stripper unit and thermally coupled to at least a portion of the heat exchanger; a membrane separator fluidly coupled to the outgassing tank and the exhaust; and a $CO_2$ header coupled to the sparging seal vessel, agitator, stripper unit, outgassing tank, and membrane separator.

In some embodiments, the input gas is a flue gas from a combustion process.

In some embodiments, the exhaust gas comprises less $CO_2$ than the input gas.

In some embodiments, the $CO_2$ absorber module further comprises a flow control damper.

In some embodiments, the flow control damper is coupled between the intake and the heat exchanger.

In some embodiments, the $CO_2$ absorber module further comprises a fan coupled to the intake.

In some embodiments, the $CO_2$ absorber module further comprises a pressure control damper.

In some embodiments, the pressure control damper is coupled between the mist eliminator and the exhaust.

In some embodiments, the heat exchanger is thermally coupled to the outgassing tank.

In some embodiments, the process fluid is water.

In some embodiments, the water is substantially amine-free.

In some embodiments, the droplets comprise a Sauter mean diameter of less than about 50 microns.

In some embodiments, at least a portion of the exhaust gas is directed to the membrane separator.

In some embodiments, the $CO_2$ header comprises a condensate trap configured to direct condensate to the outgassing tank.

In some embodiments, the $CO_2$ header comprises a fan to thereby generate a negative pressure and draw $CO_2$ from one or more of: the sparging seal vessel, the agitator, the stripper unit, the outgassing tank, and the membrane separator.

In some embodiments, the system further comprises a first transfer pump between the agitator and the stripping unit.

In some embodiments, the system further comprises a second transfer pump between the stripping unit and the outgassing tank.

In some embodiments, the system further comprises a third transfer pump between the outgassing tank and the membrane separator.

In some embodiments, the process fluid is passively directed from the $CO_2$ absorber module to the sparging seal vessel.

In some embodiments, the process fluid is passively directed from the sparging seal vessel to the agitator.

In some embodiments, the stripping unit comprises a blower configured to direct $CO_2$ released from the outgassing tank through the process fluid in the stripping unit.

In some embodiments, the process fluid is supersaturated with $CO_2$ at the sparging seal vessel.

In some embodiments, the process fluid in the agitator comprises less $CO_2$ than the process fluid in the sparging seal vessel.

In some embodiments, the process fluid in the stripping unit comprises less $CO_2$ than the process fluid in the agitator.

In some embodiments, the process fluid in the outgassing tank comprises less $CO_2$ than the process fluid in the stripping unit.

In some embodiments, the process fluid in the membrane separator comprises less $CO_2$ than the process fluid in the outgassing tank.

In accordance with another aspect of the disclosure, a method of recovering $CO_2$ from a process fluid is provided comprising: receiving an input gas at an intake; extracting thermal energy from the input gas via a heat exchanger; spraying droplets of a process fluid through the input gas at a fogging array to thereby capture $CO_2$ from the input gas in the process fluid; sparging the process fluid having captured $CO_2$ therein at a sparging seal vessel to thereby release a first portion of captured $CO_2$ and directing the first portion into a $CO_2$ header; after sparging, agitating the process fluid at an agitator to thereby release a second portion of captured $CO_2$ and directing the second portion into the $CO_2$ header; after agitating, stripping the process fluid at a stripping unit to thereby release a third portion of captured $CO_2$ and directing the third portion into the $CO_2$ header; after stripping, mixing and heating the process fluid at an outgassing tank to thereby release a fourth portion of captured $CO_2$ and directing the fourth portion into the $CO_2$ header, wherein heating is performed using at least a portion of the extracted thermal energy; and after mixing and heating, separating captured $CO_2$ from the process fluid at a membrane separator to thereby release a fifth portion of captured $CO_2$ and directing the fifth portion into the $CO_2$ header.

In some embodiments, the released first portion, second portion, third portion, fourth portion, and fifth portion of captured $CO_2$ are directed to a downstream process.

DETAILED DESCRIPTION

Figure 1:
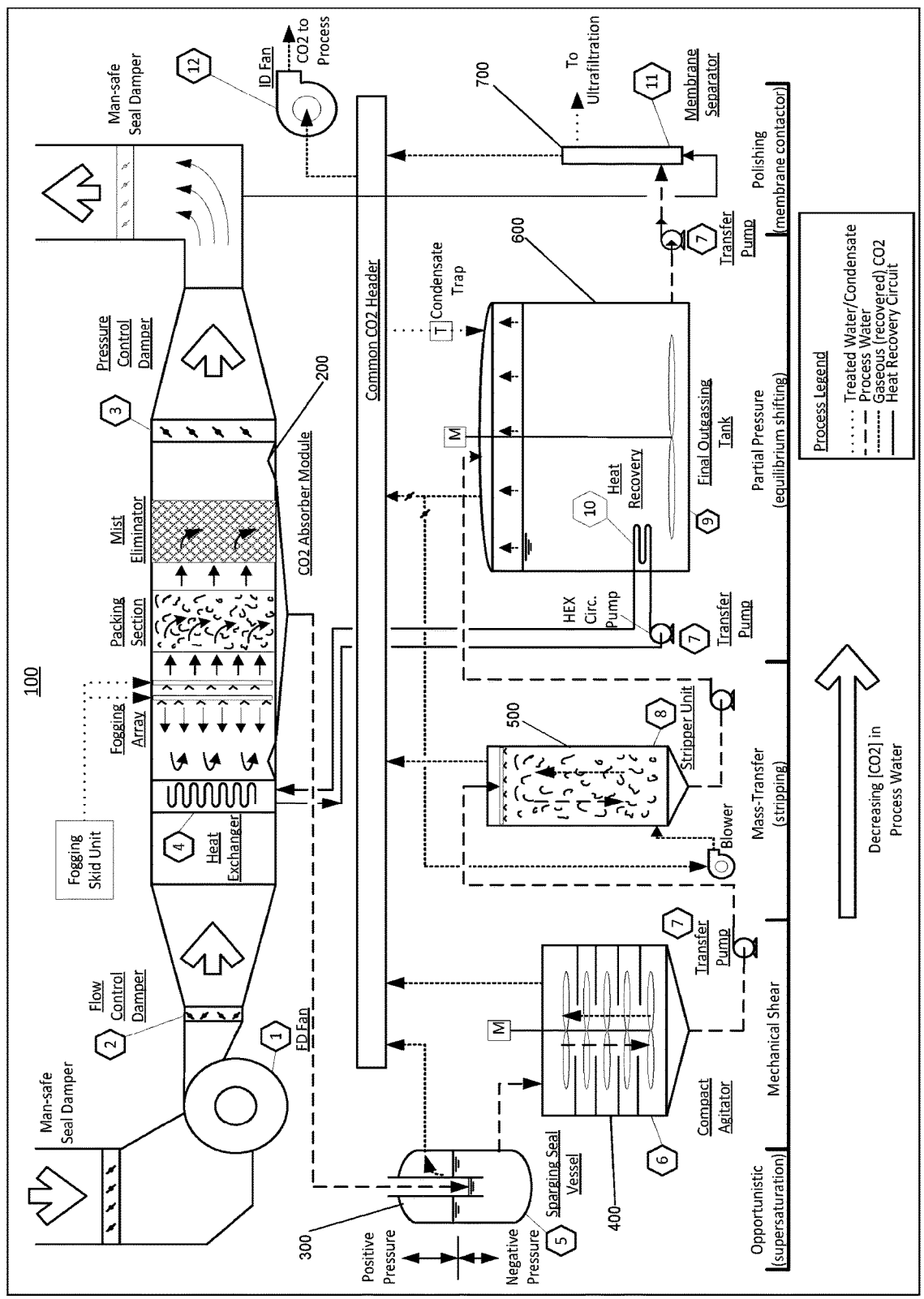
FIG. 1 illustrates a flow diagram of a $CO_2$ absorption and recovery system in accordance with an embodiment of the present disclosure.

Disclosed herein are methods and systems for reducing pollutants from a gas stream. In some embodiments, the methods and systems capture $CO_2$ from a gas stream. The $CO_2$ removal process described herein is efficient and recovers a substantial portion of $CO_2$ dissolved within a process fluid (e.g., water). The $CO_2$ removal process described herein may capture large volumes of $CO_2$ gases in the process fluid stream.

Definitions

For convenience, certain terms employed in the specification, examples, and appended claims are collected here.

The articles "a" and "an" are used herein to refer to one or to more than one (i.e., to at least one) of the grammatical object of the article. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

For purposes of this disclosure, the chemical elements are identified in accordance with the Periodic Table of the Elements, CAS version, Handbook of Chemistry and Physics, 67th Ed., 1986-87, inside cover.

The term "NOx" as used herein refers to nitrogen oxide pollutants, including nitric oxide (NO), nitrogen dioxide (NO2), nitrous oxide (N2O), and other higher oxides of nitrogen such as dinitrogen pentoxide (N2O5). Nitrogen oxides are released into the air from automobile exhaust; the burning of coal, oil, diesel fuel, and natural gas (e.g., from electric power plants); or industrial processes (e.g., welding, electroplating, engraving, and dynamite blasting).

The term "SOx" as used herein refers to sulfur oxide pollutants, including sulfur dioxide (SO2), sulfur trioxide (SO3), sulfuric acid mist (H2SO4), and sulfates. The majority of SOx pollutants is in the form of SO2 from combustion of fuels containing sulfur (e.g., bituminous coal and residual fuel oil).

The term "amine" as used herein refers to —NH2 and substituted derivatives thereof wherein one or both of the hydrogens are independently replaced with substituents selected from the group consisting of alkyl, haloalkyl, fluoroalkyl, alkenyl, alkynyl, carbocyclyl, heterocyclyl, aryl, aralkyl, heteroaryl, heteroaralkyl, alkylcarbonyl, haloalkylcarbonyl, fluoroalkylcarbonyl, alkenylcarbonyl, alkynylcarbonyl, carbocyclylcarbonyl, heterocyclylcarbonyl, arylcarbonyl, aralkyl carbonyl, heteroarylcarbonyl, heteroaralkylcarbonyl, sulfonyl, and sulfinyl groups defined above; or when both hydrogens together are replaced with an alkylene group (to form a ring which contains the nitrogen). Representative examples include, but are not limited to methylamino, acetylamino, and dimethylamino.

The term "nozzle" as used herein refers to a device that controls the direction or characteristics (e.g., velocity) of fluid flow (e.g., liquid or gas) as it exits or enters an enclosed chamber or pipe. A nozzle has at least one orifice for dispensing the fluid. A nozzle can be a cylindrical, round, or conical spout at the end of a pipe or a hose.

The term "header" as used herein refers to an assembly on which one or more nozzles is mounted. The number of nozzles on the header can vary depending on tank diameter, volumetric flow, flue gas temperature, the amount of $CO_2$ to be captured, and the number of other headers present. For example, each header can include at least 1, 14, 22, 28, 32, or 33 nozzles. In the headers disclosed herein, the nozzles can be spaced at certain distances from each other.

The term "array" as used herein refers to an assembly comprising a multitude of headers. The headers in an array can be spaced at various distances from one another.

The term "pound-force per square inch" (psi) as used herein refers to the pressure resulting from a force of one pound-force applied to an area of one square inch.

In various embodiments, the assemblies, systems, and methods described herein are capable of recovering gaseous $CO_2$ for process use from a supersaturated process water solution. In various embodiments, implementation of a $CO_2$ capture assembly (e.g., $CO_2$ absorption module 200) is generally described in U.S. Pat. No. 9,694,317 and U.S. Patent Application Publication No. 2020/0147542, each of which is hereby incorporated by reference in its entirety.

In various embodiments, the systems and methods described herein provide several advantages over systems described in the prior art. In particular, the systems and methods described herein provide continuous operation (e.g., no delivery surges, tank switching, or required regeneration periods), quick recovery system start-up and shutdown times with relatively low stabilization periods (e.g., process time constants), use of well-understood, robust, process components and unit operations, and straightforward scaling for a wide range of delivery rates.

In various embodiments, various assumptions may be used in the development of $CO_2$ recovery systems and methods. In various embodiments, the absorption of $CO_2$ (solute) may produce a metastable, supersaturated $CO_2$ process water (solvent). In various embodiments, the supersaturation state may be highly time-sensitive and unstable. In various embodiments, supersaturated process fluid may begin evolving gaseous $CO_2$ quickly once collected in bulk liquid. In various embodiments, this process water may be sensitive to mechanical disturbances, particularly shear at supersaturated conditions.

In various embodiments, the recovered $CO_2$ may inevitably contain moisture in the final output stream. In various embodiments, while some downstream processes (end users of $CO_2$) may tolerate this moisture, others might not. In various embodiments, any suitable methods for removal of undesirable moisture as are known in the art may be used (e.g., other than the use of mist eliminators at the entry points to the common $CO_2$ header from various components of the outgassing unit). In various embodiments, any particulate matter (PM) in the flue gas may become entrained in the $CO_2$ process water produced and migrate through the system. In various embodiments, any suitable methods as are known in the art may be used for handling undissolved solids.

In various embodiments, the various components in the recovery process may be matched according to suitability based on the $CO_2$ concentration in the process water. In various embodiments, the $CO_2$ fraction in the water may decrease with every step in the process. In various embodiments, most of the outgassing may occur in the sparging seal vessel 300 and the compact agitator 400, while the stripper unit 500 and the final outgassing tank 600 may serve as polishing steps.

In various embodiments, hydraulic separation of the capture and the recovery portions of the system may be implemented using the systems and method described herein. In various embodiments, hydraulic separation may prevent either unintended blow-through occurring through the various components and/or creating process disturbances that are difficult to mitigate. In various embodiments, the $CO_2$ capture/absorption may be performed under positive pressure conditions (relative to atmospheric pressure) while $CO_2$ recovery in the recovery process may be intended to be performed under slightly negative pressures.

In various embodiments, the positive pressure environment promotes solubility of the $CO_2$ (allows the $CO_2$ to remain in the process fluid), while the negative pressure has the opposite effect of promoting outgassing (allows the $CO_2$ to escape the process fluid) throughout the recovery system.

FIG. 1 illustrates a flow diagram of a $CO_2$ absorption and recovery system 100. In various embodiments, the $CO_2$ absorption and recovery system 100 includes a $CO_2$ absorber module 200, a sparging seal vessel 300, a compact agitator 400, a stripper unit 500, an outgassing tank 600, a membrane separator 700, and a common $CO_2$ header 800. In various embodiments, the $CO_2$ absorption module 200 is configured to receive an input gas (e.g., flue gas from a combustion process) through an intake. In various embodiments, the input gas includes $CO_2$ and the $CO_2$ absorber module 200 processes the input gas to thereby remove at least a portion of the $CO_2$ out from the input gas. The processed input gas (i.e., exhaust gas) is expelled from the $CO_2$ absorber module 200 via an exhaust flue. In various embodiments, the exhaust flue may be coupled to a membrane separator 700 (described in more detail below).

In various embodiments, each of the $CO_2$ absorber module 200, the sparging seal vessel 300, the compact agitator 400, the stripper unit 500, the outgassing tank 600, the membrane separator 700, and the common $CO_2$ header 800 may be sized based on the desired throughput of the system 100. In various embodiments, sizing (e.g., volume) of each of the $CO_2$ absorber module 200, the sparging seal vessel 300, the compact agitator 400, the stripper unit 500, the outgassing tank 600, the membrane separator 700, and the common $CO_2$ header 800 may be based on flow rate(s), available space, constructability, and transport considerations.

In various embodiments, at least a portion of the input gas includes $CO_2$ (e.g., 0.04%). In various embodiments, the input gas may be atmospheric air. According to NASA, atmospheric air includes approximately 78.084% nitrogen, 20.946% oxygen, 0.9340% argon, and 0.04338% other gases. Among the other gases, atmospheric air includes approximately 0.0407% carbon dioxide. In various embodiments, the input gas may be a flue gas from an upstream process (e.g., a combustion process or other chemical process).

In various embodiments, the input gas may include any suitable gas or combination of gases that includes carbon dioxide. In various embodiments, the percentage of carbon dioxide in the input gas may be less than 1%. In various embodiments, the percentage of carbon dioxide in the input gas may be about 1%. In various embodiments, the percentage of carbon dioxide in the input gas may be about 2%. In various embodiments, the percentage of carbon dioxide in the input gas may be about 5%. In various embodiments, the percentage of carbon dioxide in the input gas may be about 10%. In various embodiments, the percentage of carbon dioxide in the input gas may be about 20%. In various embodiments, the percentage of carbon dioxide in the input gas may be about 30%. In various embodiments, the percentage of carbon dioxide in the input gas may be about 40%. In various embodiments, the percentage of carbon dioxide in the input gas may be about 50%. In various embodiments, the percentage of carbon dioxide in the input gas may be about 60%. In various embodiments, the percentage of carbon dioxide in the input gas may be about 70%. In various embodiments, the percentage of carbon dioxide in the input gas may be about 80%. In various embodiments, the percentage of carbon dioxide in the input gas may be about 90%. In various embodiments, the percentage of carbon dioxide in the input gas may be less than 100%.

In various embodiments, process water is sprayed in droplet form in the fogging array. In various embodiments, the water droplets are capable of capturing $CO_2$ from the input gas. In various embodiments, the process water is saturated at least in part (e.g., supersaturated) with $CO_2$ and is directed, either actively (e.g., pumped) or passively (e.g., drained), to the sparging seal vessel 300. In various embodiments, the sparging seal vessel 300 is fluidly coupled to an agitator 400. Throughout this disclosure, adjacent or upstream/downstream components can include a separate conduit(s)—a first dedicated to input flow, and a second dedicated for output flow. For example, a first conduit can be used to deliver fluid at a positive pressure from the sparging vessel 300 to the common $CO_2$ header 800, while a second conduit can be used to deliver fluid at a negative pressure to the compact agitator 400.

In various embodiments, the agitator 400 is fluidly coupled to a stripper unit 500, with an intervening transfer pump disposed therebetween for providing increased pressure to the agitator output. In various embodiments, the stripper unit is fluidly coupled to an outgassing tank 600, and a blower can be provided to operate on the stripper unit 500 and increase circulation within its interior volume. In various embodiments, the outgassing tank 600 is fluidly coupled to a membrane separator 700 with an intervening pump disposed therebetween. Also, a heat recovery operation can be performed, e.g. via a HEX circulation pump, with the outgassing tank 600 to achieve the desired temperature profile.

In various embodiments, the sparging seal vessel 300, the agitator 400, the stripper unit 500, the outgassing tank 600, and/or the membrane separator 700 are fluidly coupled to a common $CO_2$ header. In various embodiments, the common $CO_2$ header 800 collects $CO_2$ (e.g. approximately 100% $CO_2$) that is recovered from the process water and directs the collected $CO_2$ to an output.

In various embodiments, at each stage in the processing of the process water (e.g., the sparging seal vessel 300, the agitator 400, the stripper unit 500, the outgassing tank 600, and/or the membrane separator 700), the total amount of $CO_2$ in the process water may decrease as $CO_2$ is recovered during each stage. In various embodiments, the various stages of processing the process water to thereby recover $CO_2$ may be referred to as the recovery section of the system 100.

Figure 2A:
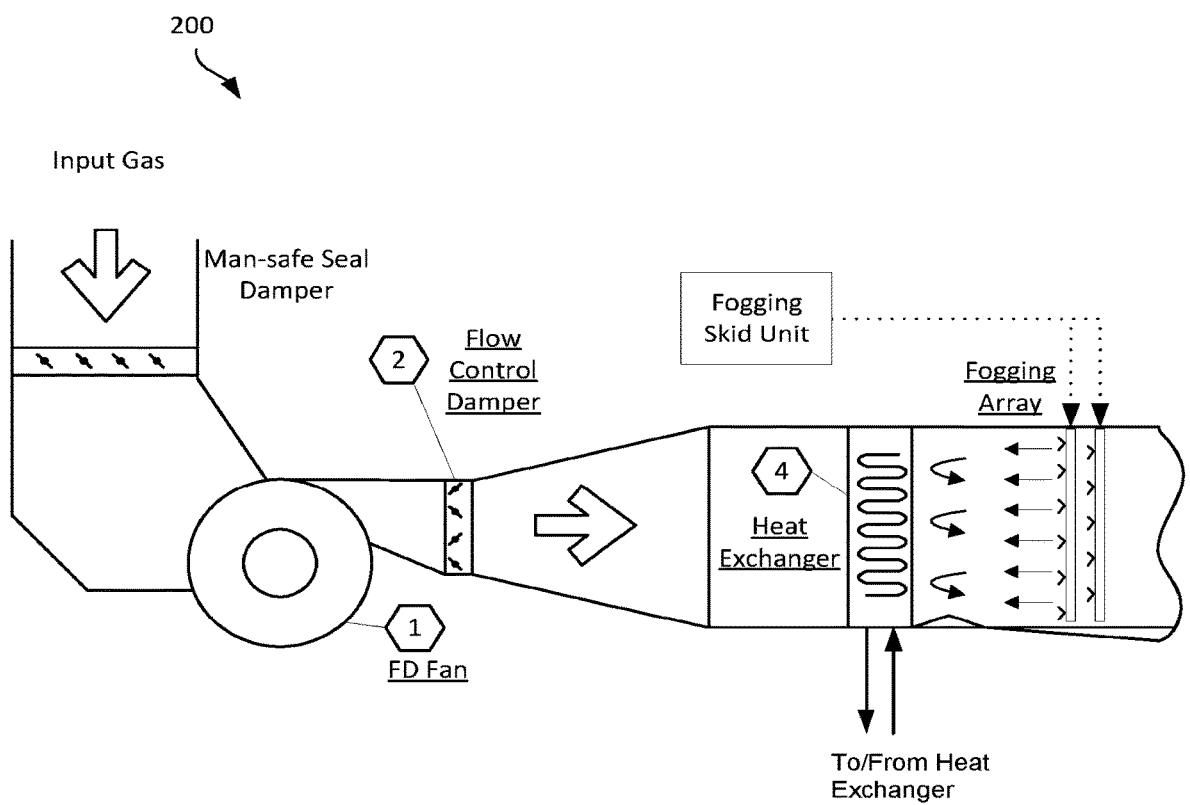
FIGS. 2A-2B illustrate a $CO_2$ absorber module in accordance with an embodiment of the present disclosure.
Figure 2B:
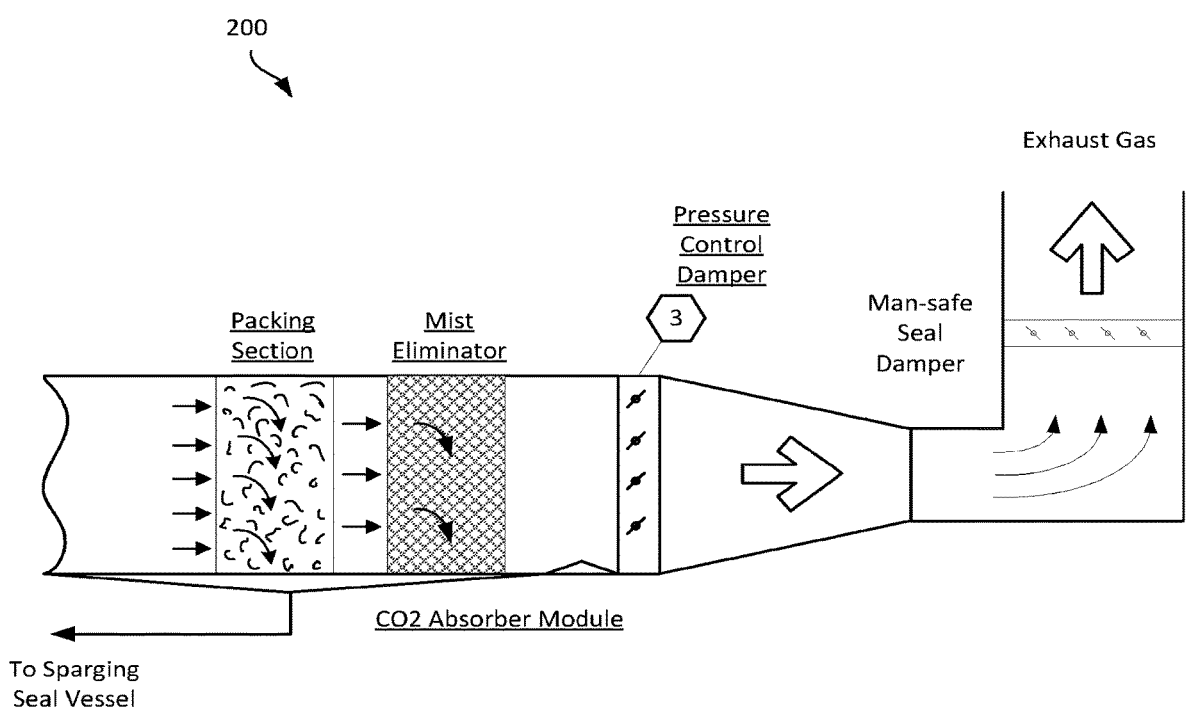

FIGS. 2A-2B illustrate a $CO_2$ absorber module 200. In particular, to better illustrate the features of the $CO_2$ absorber module 200, FIG. 2A illustrates the front portion (e.g., front half) of the $CO_2$ absorber module 200 beginning with the intake and FIG. 2B illustrates the back portion (e.g., back half) of the $CO_2$ absorber module 200 ending with the exhaust of the waste stream of gas (e.g., processed input gas). In various embodiments, the intake and/or exhaust of the $CO_2$ absorption module 200 may include a man-safe seal damper to thereby provide almost complete isolation (e.g., 100% isolation) of the system. In various embodiments, the man-safe seal damper may be accessible to workers for maintenance.

In various embodiments, positive pressure conditions may be generated and maintained within the $CO_2$ absorber module using three key components: a forced draft (FD) fan 1, a flow control damper 2, and a pressure control damper 3. In various embodiments, the fan 1 draws in input gas (e.g., flue gas from a combustion source) into the $CO_2$ absorption module 200. In various embodiments, the flow control damper 2 that input gas passes through can be positioned upstream, proximate the inlet of the absorber module, as shown in FIG. 2B. In various embodiments, the flow control damper 2 produces a desired flue gas velocity into the fogging array. In various embodiments, this may also be accomplished using a variable frequency drive on the FD fan motor.

In various embodiments, the $CO_2$ absorption module 200 includes a pressure control damper 3. In various embodiments, a casing pressure may be controlled using a pressure control damper 3 at the rear of the vessel. Additionally, the pressure control damper 3 can be located downstream of the $CO_2$ absorber.

In various embodiments, the $CO_2$ absorption module 200 includes a heat exchanger 4 fluidly coupled to the intake. In various embodiments, a dedicated heat recovery heat exchanger 4 may be fitted into the $CO_2$ absorption module 200 before, or upstream of, the fogging array. The heat exchanger can be configured for parallel or counter flow heat transfer, with a variety of fluids serving as the coolant medium. Also, the heat exchanger can be located at a middle of the input gas stream (i.e. where it is a "fully developed" flow an exhibiting a maximum velocity).

In various embodiments, the $CO_2$ absorption module 200 includes a fogging array. Exemplary fogging arrays are described in more detail in U.S. Patent Application Publication No. 2020/0147542, which is hereby incorporated by reference in its entirety. In various embodiments, the fogging array may include a plurality of nozzles configured to spray droplets of a process fluid through the input gas. In various embodiments, the droplets may have a Sauter mean diameter of 50 microns or less. In various embodiments, the fogging array may include a fogging skid unit. In various embodiments, the fogging skid unit may be a subsystem of the absorption module. In various embodiments, the fogging skid unit may be configured to produce water droplets used for $CO_2$ absorption. In various embodiments, the fogging skid unit may contain one or more high pressure pumps, one or more filters, and/or piping connecting the various internal skid components and the fogging skid unit to the $CO_2$ absorption module 200.

In various embodiments, the $CO_2$ absorption module 200 includes a packing section. In various embodiments, the packing section is optional. In various embodiments, the packing section may be used to provide a large wetted surface area in a relatively small volume within the $CO_2$ absorption module 200. In various embodiments, the packing section promotes the collection of the water droplets containing $CO_2$ into a bulk liquid that can then be directed to the outgassing process with minimal carryover. In various embodiments, the packing section may include specially-designed geometric forms that provide the desired surface characteristics (e.g., maximizing surface area for a specified volume).

In various embodiments, the $CO_2$ absorption module 200 includes a mist eliminator. In various embodiments, the mist eliminator may be placed at the outlet of the exhaust. In various embodiments, the mist eliminator may capture any additional process fluid having dissolved $CO_2$ therein. In various embodiments, the mist eliminator may capture water aerosol carryover flowing past the packing section. In various embodiments, the mist eliminator may collect water aerosol carryover as bulk water to be provided to the outgassing process for further outgassing. In various embodiments, the use of a mist eliminator may be preferable when the aerosol (mist) contains absorbed $CO_2$ that would otherwise exit the capture process. The mist eliminator can extend across the entire width of the $CO_2$ absorber module.

In various embodiments, the $CO_2$ absorption module 200 includes a pressurized casing unit configured to provide positive pressure to direct (e.g., passively) the $CO_2$ process water into the recovery section of the system. In various embodiments, a positive pressure casing may eliminate the need for a two-phase pump that may otherwise be required to prevent cavitation. In various embodiments, given the natural tendency of supersaturated process water to evolve $CO_2$ almost immediately, any gaseous $CO_2$ may be continually pushed out (e.g., via an active process) of the $CO_2$ absorption module 200 into the recovery process. In various embodiments, two-phase flow may develop in the piping between the $CO_2$ absorption module 200 and the sparging seal vessel 300. In various embodiments, two-phase flow may be mitigated using the positive pressure scheme.

Figure 3A:
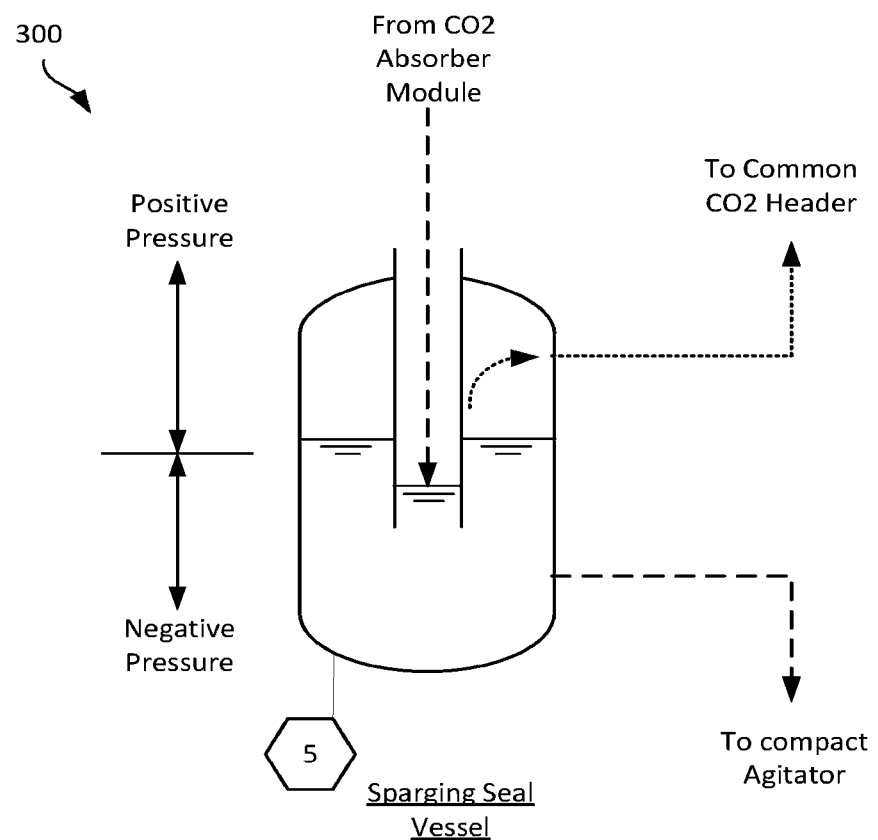
FIGS. 3A-3B illustrate a sparging seal vessel in accordance with an embodiment of the present disclosure.
Figure 3B:
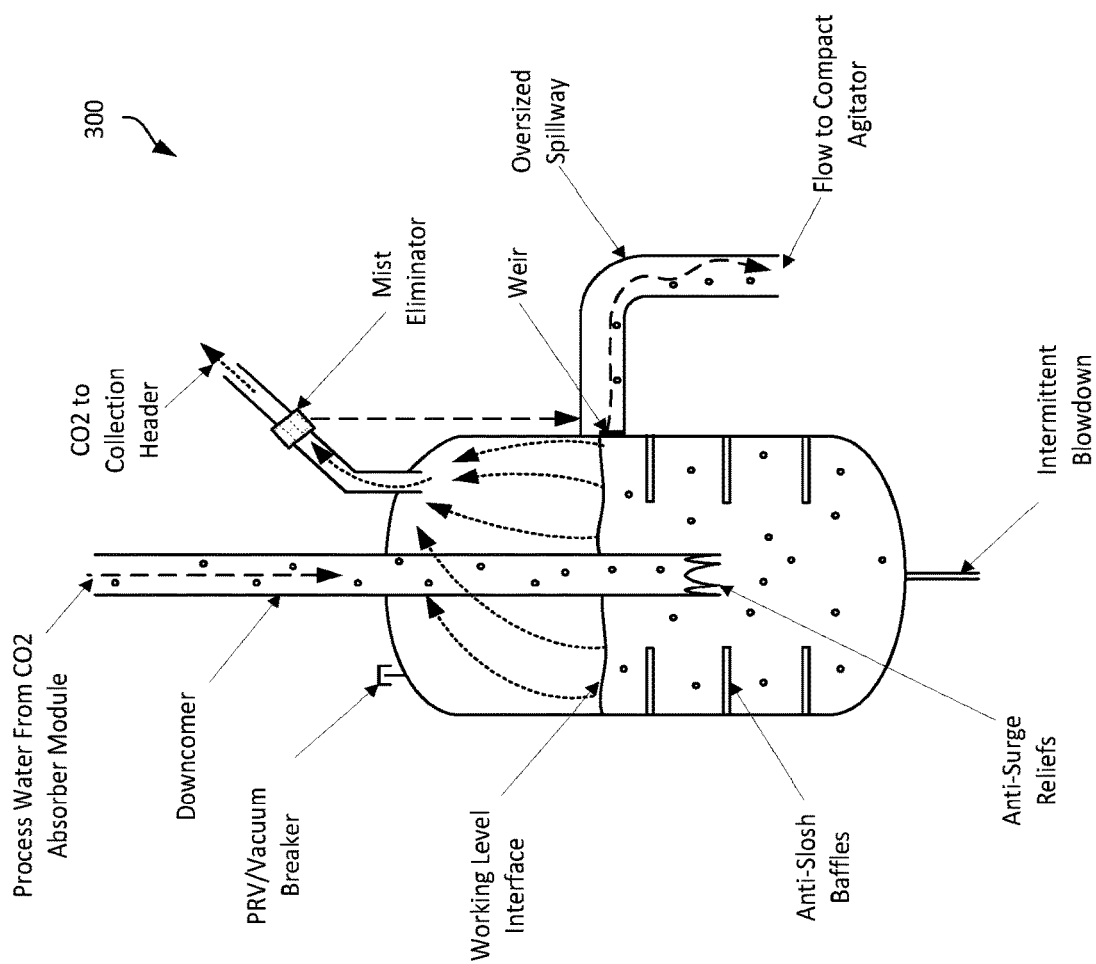

FIGS. 3A-3B illustrate a sparging seal vessel 300. In various embodiments, the sparging seal vessel 300 may be sized based on the desired throughput of the system 100. In various embodiments, sizing (e.g., volume) of the sparging seal vessel 300 may be based on flow rate(s), available space, constructability, and transport considerations. In various embodiments, two or more sparging seal vessels may function in parallel within the system 100. In various embodiments, supersaturated $CO_2$ process water is received by a passive (e.g., gravity) feed into the sparging seal vessel 300. In various embodiments, the sparging seal vessel 300 serves as a seal pot and provides hydraulic separation between the components/sections of the system that operate under positive pressure (i.e. the components upstream of the sparging vessel 300) and the components/sections of the system that operate under negative pressure (i.e. the components downstream of the sparging vessel). In various embodiments, the positive and/or negative pressures may be generated by the FD fan(s) and/or ID fan(s) in the $CO_2$ absorption module 200 and the common $CO_2$ header 800, respectively. In various embodiments, the positive and negative pressures may be separated hydraulically with a water seal in the sparging seal vessel 300. In various embodiments, process water from the $CO_2$ absorption module 200 is sparged into the vessel by gravity, the positive pressure from the $CO_2$ absorption module 200 (generated by FD fan 1, flow control damper 2, and/or pressure control damper 3), and the induced negative pressure of the $CO_2$ collection header 800 (generated by ID fan 12). In various embodiments, special cutouts at the bottom end of a downcomer help to self-regulate the level in the vessel during times of transient differential pressure disturbances. In various embodiments, internal baffles within the sparger may be provided to dampen oscillations. In various embodiments, the internal baffles may include any suitable structures (e.g., horizontal shelves) or features (e.g., perforations or holes) to provide adequate dampening of the fluid within the sparging seal vessel 300. In various embodiments, any immediate outgassing of $CO_2$ from the process water may be directed to the $CO_2$ header. In various embodiments, an internal weir may be designed to set the discharge water level. In various embodiments, the process water may be directed to the compact agitator 400 via a discharge pipe which maintains a predetermined amount of gas headspace above the liquid. In various embodiments, the discharge pipe may be oversized, and positioned above the anti-surge reliefs, as shown. In various embodiments, the discharge pipe may be sized based on throughput of the system 100. In various embodiments, the oversized spillway may be configured to minimize (e.g., prevent) the siphoning of process water out of the sparging seal vessel 300 that may disrupt the water seal within the sparging seal vessel 300. In various embodiments, the specific geometry used for the sparging seal vessel 300 may allow for an adequate headspace above the water discharge from the sparging seal vessel 300. In various embodiments, a predetermined amount (e.g., height, volume, etc.) of gas headspace is used to maintain level stability and to prevent siphoning or surging within the vessel. In various embodiments, the concentration of $CO_2$ leaving the sparging seal vessel 300 may be subject to the capture efficiency and concentrations produced in the absorber module 200. In various embodiments, the $CO_2$ concentration may be in a supersaturated state.

In various embodiments, intermittent blowdown may be defined as the intentional, periodic draining of process water from the sparging seal vessel 300. In various embodiments, the function of intermittent blowdown is to remove dirt, scale, sludge, ash, and/or other particulate matter that is entrained within the process water. In various embodiments, these solids are not desirable and may collect in the sparging seal vessel 300.

In various embodiments, anti-surge reliefs in the sparging seal vessel 300 may be used as a simple, self-correcting method of dampening any level upsets in the sparging seal vessel 300 downcomer.

In various embodiments, anti-slosh baffles may be static structures primarily used to quickly dampen oscillations caused by pressure excursions in either the $CO_2$ absorber module 200, the downstream outgassing operations, common $CO_2$ header 800, and/or $CO_2$ gas end-user. In the exemplary embodiment shown in FIG. 3B, the baffles are aligned horizontally, but alternative (e.g. staggered or offset) configurations can be employed. In various embodiments, pressure excursions can be caused by several scenarios ranging from boiler furnace pressure control problems, fan failures, and downstream $CO_2$ process trips. In various embodiments, other features as are known in the art may be designed into the process control safety systems to further address these scenarios. In various embodiments, sloshing may help promote further outgassing, but may be undesirable as sloshing may negatively affect the stability of the sparging seal vessel 300.

Figure 4A:
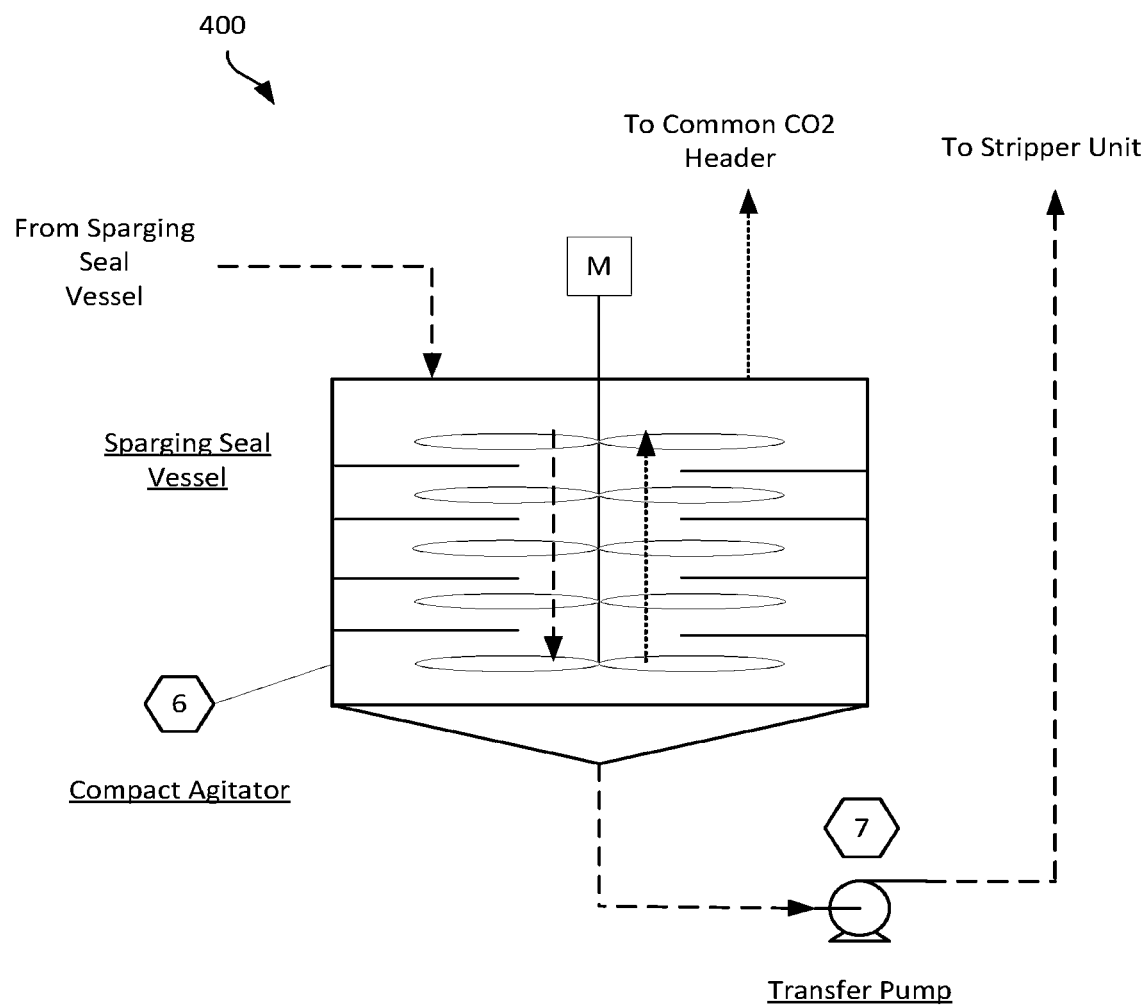
FIGS. 4A-4B illustrate a compact agitator in accordance with an embodiment of the present disclosure.
Figure 4B:
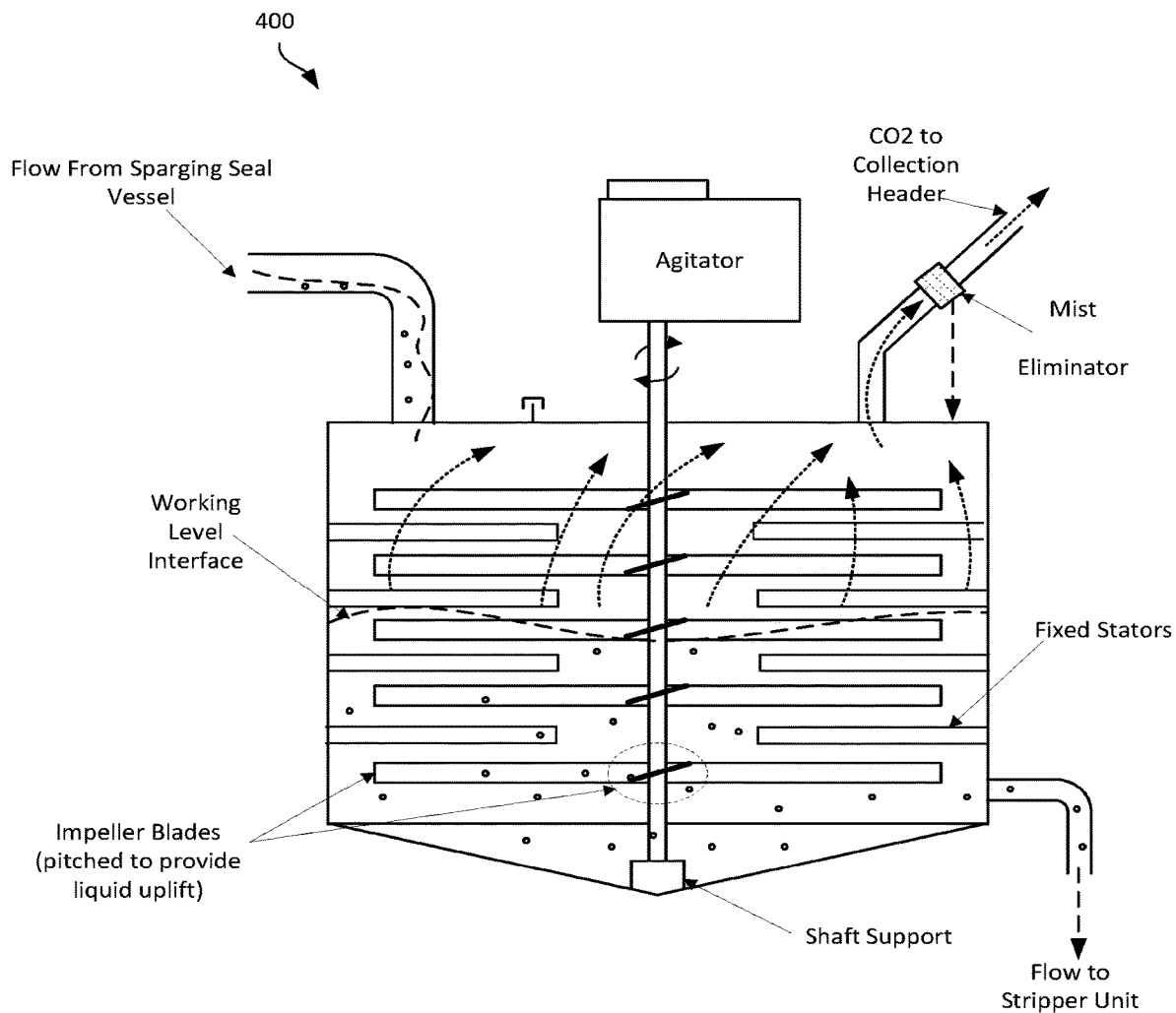

FIGS. 4A-4B illustrate a compact agitator 400. In various embodiments, the process water directed to the compact agitator 400 may be supersaturated $CO_2$ process water. In various embodiments, the process water may be received by a passive (e.g., gravity) feed from the sparging seal vessel 300 and into the compact agitator unit 400. In various embodiments, the compact agitator 400 includes a relatively high-speed, motor driven agitator shaft with pitched blades. In various embodiments, the compact agitator 400 includes one or more fixed stator blades fastened to the tank wall. In various embodiments, the blades may spin in between the stator blades, in either clockwise or counterclockwise directions, and interchangeably between both directions in some embodiments. In various embodiments, the agitator 400 may induce mechanical shear on the fluid as the pitched blades rotate in between the stator blades. In various embodiments, the agitator blades may be pitched such that they provide uplift in the process water. In various embodiments, rotational speed and/or specific geometry of the agitator may be determined based on requirements of the system 100. For example, rotational speed may be optimized to promote outgassing. In another example, volume of the agitator may be optimized based on flow rate or processing rate of the system 100. In various embodiments, the baffles (stators) in the compact agitator may be configured to create high sheer forces within the process water in the agitator 400. In various embodiments, the agitator 400 may include a single shaft having pitched blades. In various embodiments, the agitator may include two or more shafts where each shaft includes pitched blades.

In various embodiments, the blades impose highly turbulent sheer into the $CO_2$ process water, thereby encouraging maximum release of $CO_2$ from the process water. In various embodiments, gaseous $CO_2$ is vented from the top of the agitator, where it is directed to the common $CO_2$ collection header. In various embodiments, after turbulent agitation, the supersaturated process water may become depleted. In various embodiments, depleted process water may still contain some $CO_2$. In various embodiments, the $CO_2$ concentration may decrease as the process water progresses through the outgassing system. In various embodiments, the depleted process water exits the bottom of the agitator 400. In various embodiments, the dissolved $CO_2$ content of the process water may be low enough where cavitation of $CO_2$ gas is minimized and transport by a transfer pump 7 is feasible throughout the rest of the system.

Figure 5:
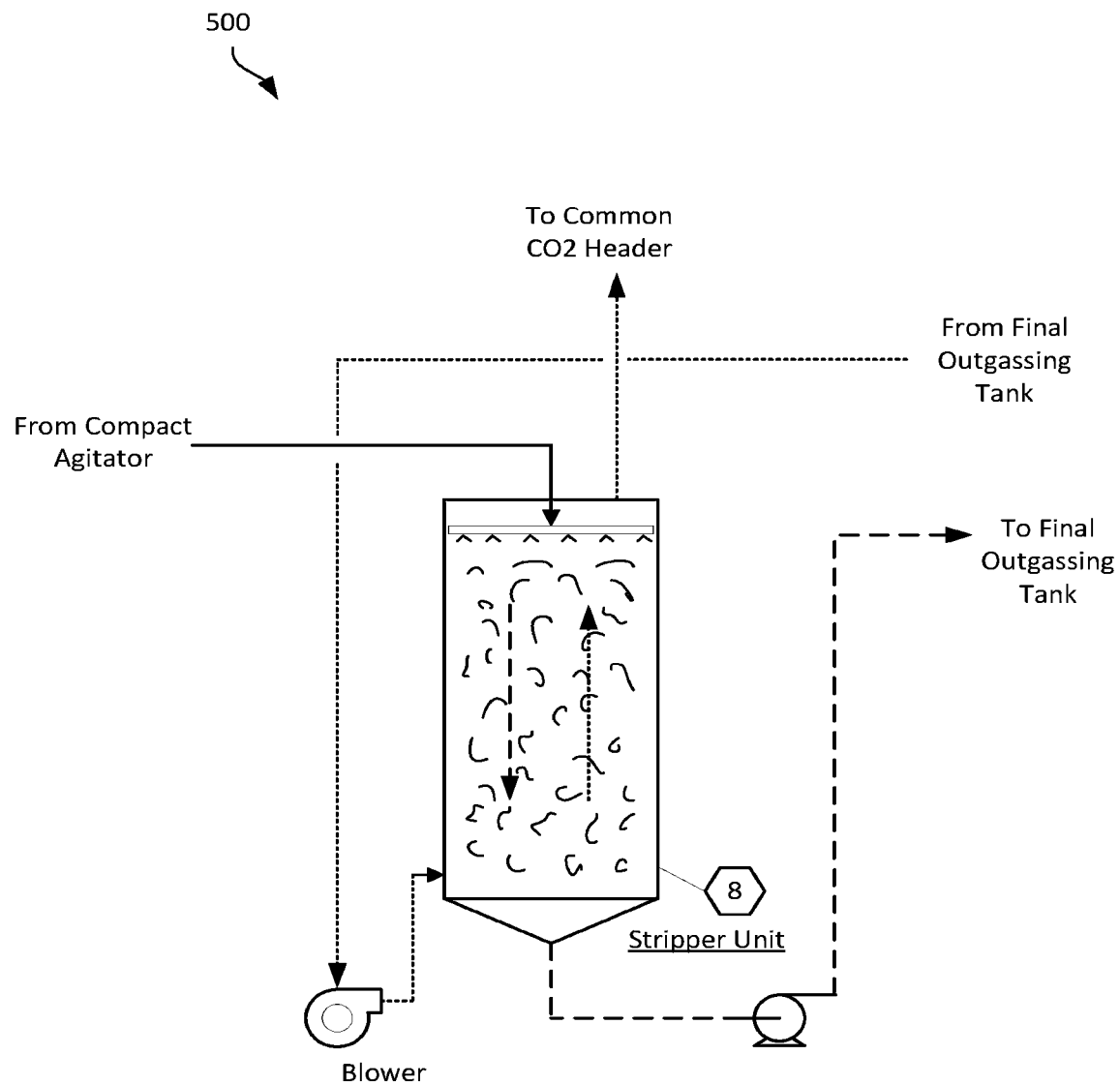
FIG. 5 illustrates a stripper unit in accordance with an embodiment of the present disclosure.

FIG. 5 illustrates a stripper unit 500 in the form of a tower structure. In various embodiments, the now-lower $CO_2$ concentration process water is received by transfer pump 7, which pumps the process water into the stripper unit 500. In various embodiments, the stripper unit 500 may include a conventional packed tower used in liquid/gas separation unit operations and may function on similar mass-transfer principles. In various embodiments, process water may enter the top of the stripper unit 500 tower via a spray nozzle array. In various embodiments, the process water may flow downward and countercurrent against an upward gas phase within the packing section. In various embodiments, the gas phase may be received from $CO_2$ off-gas from the final outgassing tank 600. In various embodiments, the gas phase may be further enriched through the stripper unit using an external fan. In various embodiments, the fan induces increased partial vacuum on the final outgassing tank which, in turn, promotes further outgassing. In various embodiments, stripped $CO_2$ is directed into the common $CO_2$ collection header 800. In various embodiments, the further depleted $CO_2$ process water may exits the bottom of the stripper unit 500 tower and is moved by transfer pump 7 to the final outgassing tank 600.

Figure 6:
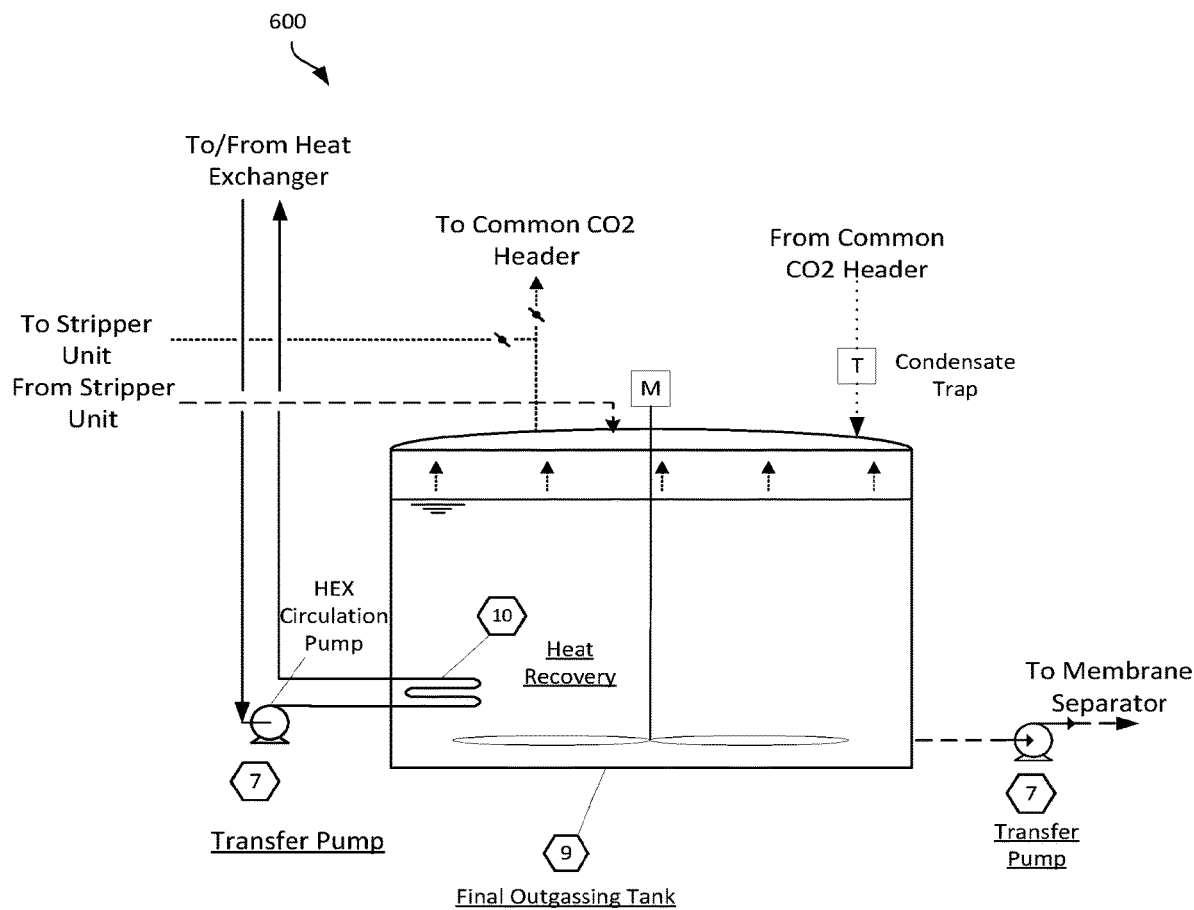
FIG. 6 illustrates a final outgassing tank in accordance with an embodiment of the present disclosure.

FIG. 6 illustrates a final outgassing tank 600. In various embodiments, the valves shown in FIG. 6 represent balancing dampers that can be used to direct $CO_2$ to either the $CO_2$ collection header, the stripper, and/or a combination of both. In various embodiments, the system may include any suitable number of valves and/or dampers. In various embodiments, given that the $CO_2$ process water concentration may be at or near Henry's Law levels, the outgassing tank 600 serves as a large interface surface area tank. In various embodiments, light agitation may be provided via a blade rotatingly coupled to a motor M. In various embodiments, light agitation serves to provide uniform concentration and mixing of the process water. In various embodiments, the outgassing tank 600 can be sized to provide a desired buffer of contingency system water for unexpected scenarios. In various embodiments, the outgassing tank 600 may be fitted with one or more internal baffles that will guide the water through a circuitous path to optimize outgassing. In various embodiments, $CO_2$ evolved from the process water may be directed back to the stripper unit 500. In various embodiments, $CO_2$ evolved from the process water may, optionally or additionally, be diverted directly to the common $CO_2$ header 800. In various embodiments, spent $CO_2$ process water may be pumped via a transfer pump 7 to the ultrafiltration system for recycle.

In various embodiments, because the $CO_2$ process water concentrations of the outgassing tank 600 are at or near Henry's Law levels, additional drivers may be needed to push the equilibrium in favor of gas release. In various embodiments, this may be accomplished by recovering heat energy from the input gas and directing it into the final outgassing tank. In various embodiments, a working fluid is circulated through a heat exchanger in the $CO_2$ Absorber Module 200 and into another heat exchanger 10 located in the final outgassing tank 600. In various embodiments, the heat exchanger 10 may increase temperature, and therefore increase the vapor pressure, of dissolved $CO_2$ in the process water to thereby promote a favorable shift in equilibrium toward outgassing. In various embodiments, increased partial vacuum provided by a fan in the stripper unit 500 further promotes $CO_2$ gas production in the outgassing tank 600.

Figure 7:
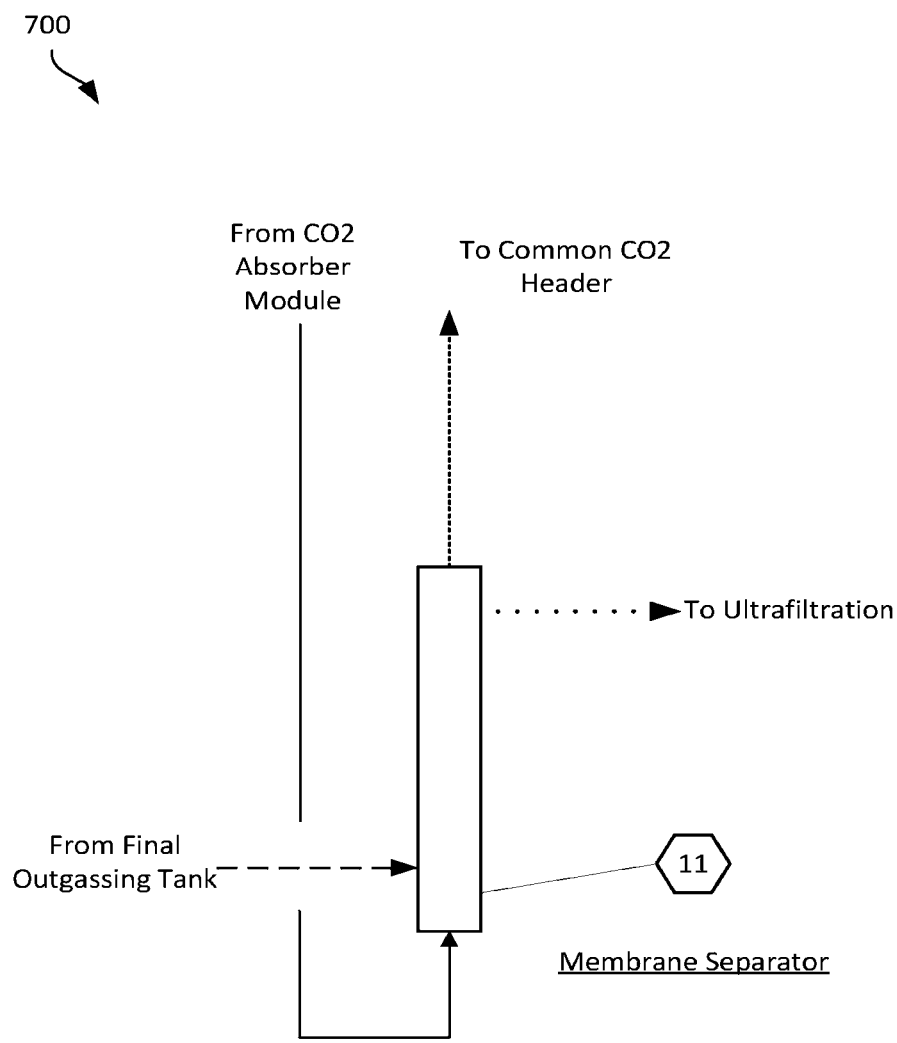
FIG. 7 illustrates a membrane separator in accordance with an embodiment of the present disclosure.

FIG. 7 illustrates a membrane separator 700. In various embodiments, trace concentrations of $CO_2$ from the final outgassing tank 600 are removed from the process water using a membrane separator 700. In various embodiments, the membrane separator 700 may include any suitable commercially available membrane gas separator unit. In various embodiments, process water may be directed against a slipstream of flue gas from the exhaust of the $CO_2$ absorber module 200. In various embodiments, any $CO_2$ recovered at this stage may be directed to the common $CO_2$ collection header 800.

Figure 8:
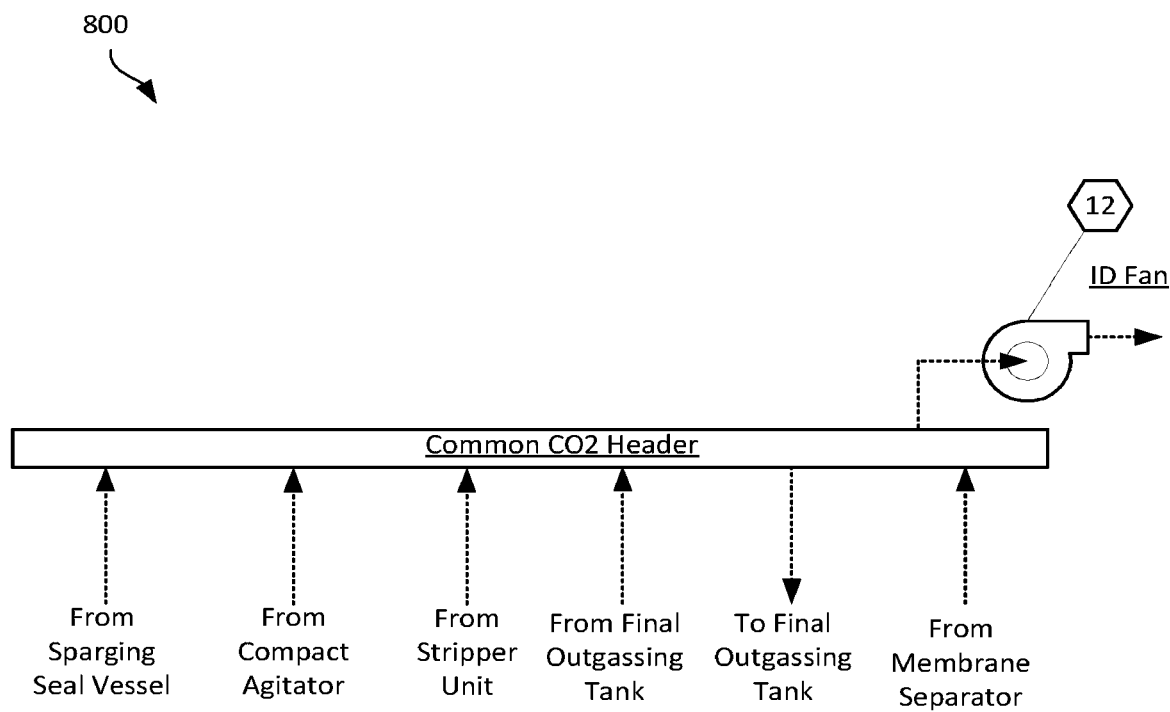
FIG. 8 illustrates a common $CO_2$ header in accordance with an embodiment of the present disclosure.

FIG. 8 illustrates a common $CO_2$ header 800. In various embodiments, gaseous $CO_2$ from all the respective degassing unit operations is directed into a common $CO_2$ header 800. In various embodiments, condensation of water vapor in the common $CO_2$ header 800 will be directed to an appropriate water trap and/or returned to the final outgassing tank 600. In various embodiments, collected gaseous $CO_2$ may be directed as output to a downstream process. In various embodiments, the collected gaseous $CO_2$ may be directed using a dedicated Induced Draft (ID) Fan 12. In various embodiments, the ID fan speed may be controlled to a specific pressure set-point. In various embodiments, The ID fan 12 may provide a negative pressure source to all $CO_2$ recovery steps to aid system function.

While the disclosed subject matter is described herein in terms of certain preferred embodiments, those skilled in the art will recognize that various modifications and improvements may be made to the disclosed subject matter without departing from the scope thereof. Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

In addition to the specific embodiments claimed below, the disclosed subject matter is also directed to other embodiments having any other possible combination of the dependent features claimed below and those disclosed above. As such, the particular features presented in the dependent claims and disclosed above can be combined with each other in other manners within the scope of the disclosed subject matter such that the disclosed subject matter should be recognized as also specifically directed to other embodiments having any other possible combinations. Thus, the foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the method and system of the disclosed subject matter without departing from the spirit or scope of the disclosed subject matter. Thus, it is intended that the disclosed subject matter include modifications and variations that are within the scope of the appended claims and their equivalents.

What is claimed is:

1. A system comprising:
   a $CO_2$ absorber module comprising:
      an intake configured to receive an input gas;
      a heat exchanger coupled to the intake;
      a fogging array coupled to the heat exchanger, wherein the fogging array is configured to spray a process fluid via droplets to thereby capture $CO_2$ from the input gas;
      a packing section coupled to the fogging array;
      a mist eliminator coupled to the packing section;
      an exhaust coupled to the mist eliminator, the exhaust configured to release an exhaust gas;
   a sparging seal vessel fluidly coupled to the fogging array, the packing section, and the mist eliminator;
   an agitator fluidly coupled to the sparging seal vessel;
   a stripper unit fluidly coupled to the agitator;
   an outgassing tank fluidly coupled to the stripper unit and thermally coupled to at least a portion of the heat exchanger;
   a membrane separator fluidly coupled to the outgassing tank and the exhaust; and
   a $CO_2$ header coupled to the sparging seal vessel, agitator, stripper unit, outgassing tank, and membrane separator.

2. The system of claim 1, wherein the input gas is a flue gas from a combustion process.

3. The system of claim 1, wherein the exhaust gas comprises less $CO_2$ than the input gas.

4. The system of claim 1, wherein the $CO_2$ absorber module further comprises a flow control damper.

5. The system of claim 4, wherein the flow control damper is coupled between the intake and the heat exchanger.

6. The system of claim 1, wherein the $CO_2$ absorber module further comprises a fan coupled to the intake.

7. The system of claim 1, wherein the $CO_2$ absorber module further comprises a pressure control damper.

8. The system of claim 7, wherein the pressure control damper is coupled between the mist eliminator and the exhaust.

9. The system of claim 1, wherein the process fluid is water.

10. The system of claim 9, wherein the water is substantially amine-free.

11. The system of claim 1, wherein the droplets comprise a Sauter mean diameter of less than about 50 microns.

12. The system of claim 1, wherein at least a portion of the exhaust gas is directed to the membrane separator.

13. The system of claim 1, wherein the $CO_2$ header comprises a condensate trap configured to direct condensate to the outgassing tank.

14. The system of claim 1, wherein the $CO_2$ header comprises a fan to thereby generate a negative pressure and draw $CO_2$ from one or more of: the sparging seal vessel, the agitator, the stripper unit, the outgassing tank, and the membrane separator.

15. The system of claim 1, further comprising a first transfer pump between the agitator and the stripper unit.

16. The system of claim 1, further comprising a second transfer pump between the stripper unit and the outgassing tank.

17. The system of claim 1, further comprising a third transfer pump between the outgassing tank and the membrane separator.

18. The system of claim 1, wherein the process fluid is passively directed from the $CO_2$ absorber module to the sparging seal vessel.

19. The system of claim 1, wherein the process fluid is passively directed from the sparging seal vessel to the agitator.

20. The system of claim 1, wherein the stripper unit comprises a blower configured to direct $CO_2$ released from the outgassing tank through the process fluid in the stripper unit.

21. The system of claim 1, wherein the process fluid is supersaturated with $CO_2$ at the sparging seal vessel.

22. The system of claim 1, wherein the process fluid in the agitator comprises less $CO_2$ than the process fluid in the sparging seal vessel.

23. The system of claim 1, wherein the process fluid in the stripper unit comprises less $CO_2$ than the process fluid in the agitator.

24. The system of claim 1, wherein the process fluid in the outgassing tank comprises less $CO_2$ than the process fluid in the stripper unit.

25. The system of claim 1, wherein the process fluid in the membrane separator comprises less $CO_2$ than the process fluid in the outgassing tank.

26. A method of recovering $CO_2$ from a process fluid, the method comprising:
   receiving an input gas at an intake;
   extracting thermal energy from the input gas via a heat exchanger;
   spraying droplets of a process fluid through the input gas at a fogging array to thereby capture $CO_2$ from the input gas in the process fluid;
   sparging the process fluid having captured $CO_2$ therein at a sparging seal vessel to thereby release a first portion of captured $CO_2$ and directing the first portion into a $CO_2$ header;
   after sparging, agitating the process fluid at an agitator to thereby release a second portion of captured $CO_2$ and directing the second portion into the $CO_2$ header;
   after agitating, stripping the process fluid at a stripping unit to thereby release a third portion of captured $CO_2$ and directing the third portion into the $CO_2$ header;
   after stripping, mixing and heating the process fluid at an outgassing tank to thereby release a fourth portion of captured $CO_2$ and directing the fourth portion into the $CO_2$ header, wherein heating is performed using at least a portion of the extracted thermal energy; and
   after mixing and heating, separating captured $CO_2$ from the process fluid at a membrane separator to thereby release a fifth portion of captured $CO_2$ and directing the fifth portion into the $CO_2$ header.

27. The method of claim 26, wherein the released first portion, second portion, third portion, fourth portion, and fifth portion of captured $CO_2$ are directed to a downstream process.

* * * * *